Figure 3:
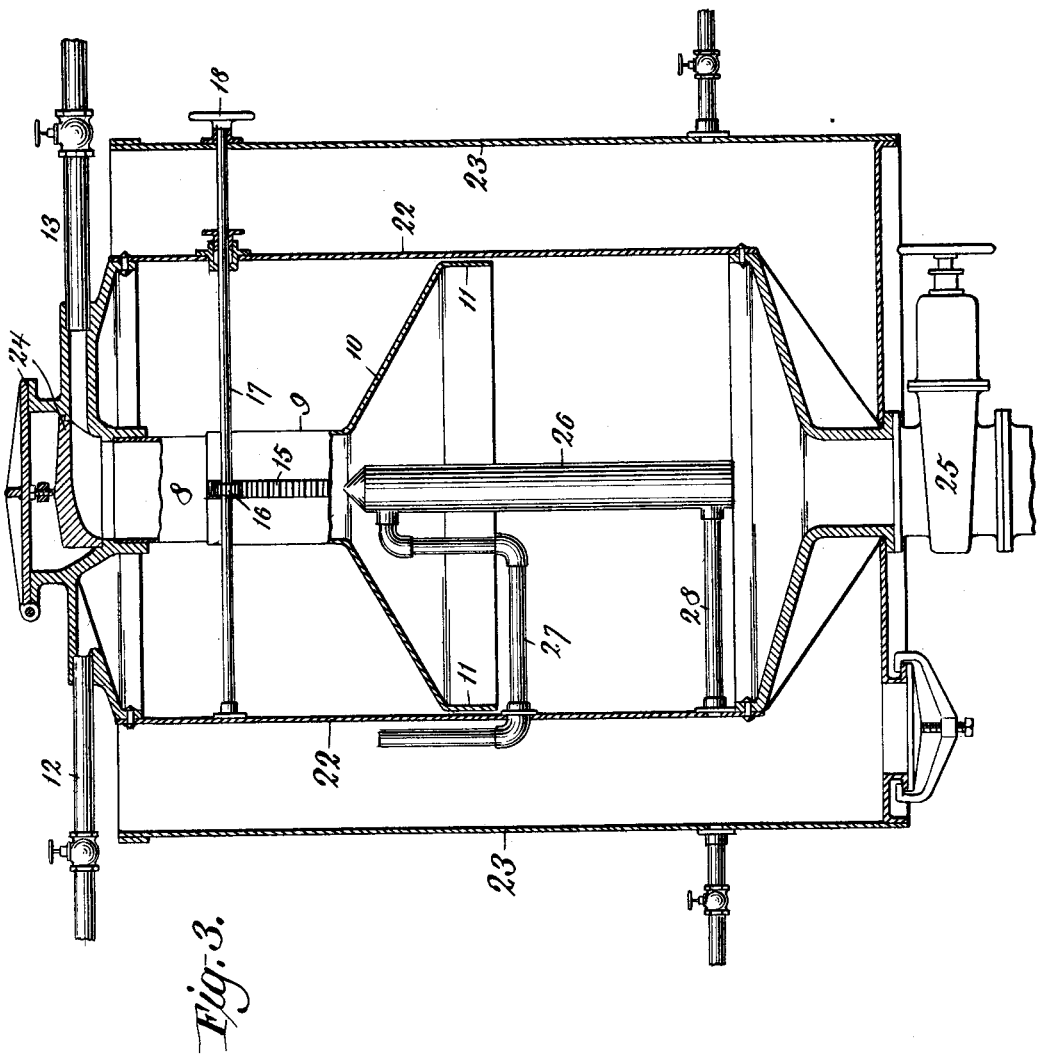

No. 675,949. Patented June 11, 1901.
D. H. HAYWOOD.
APPARATUS FOR SEPARATING FLUIDS OF DIFFERENT DENSITIES.
(Application filed Oct. 25, 1900.)
(No Model.) 2 Sheets—Sheet 1.
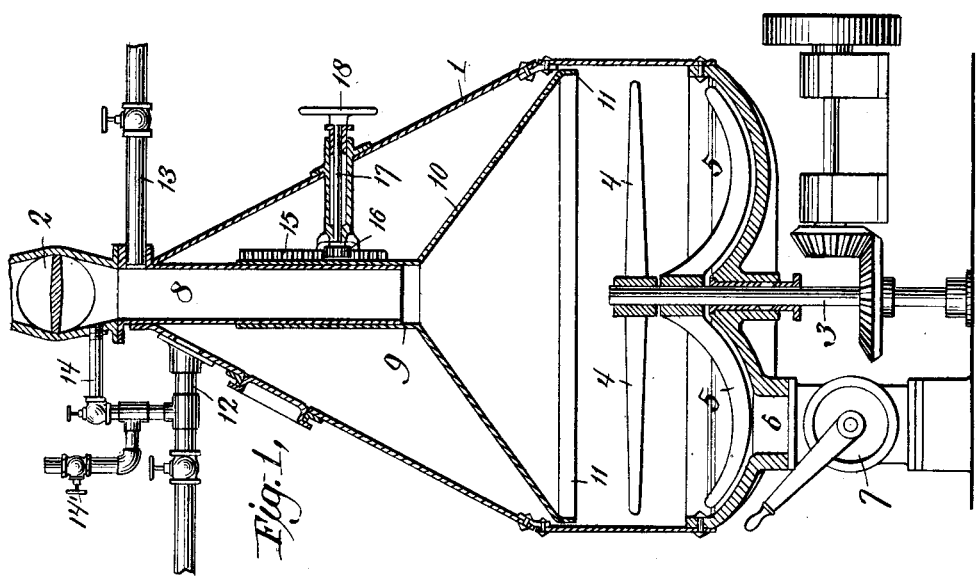
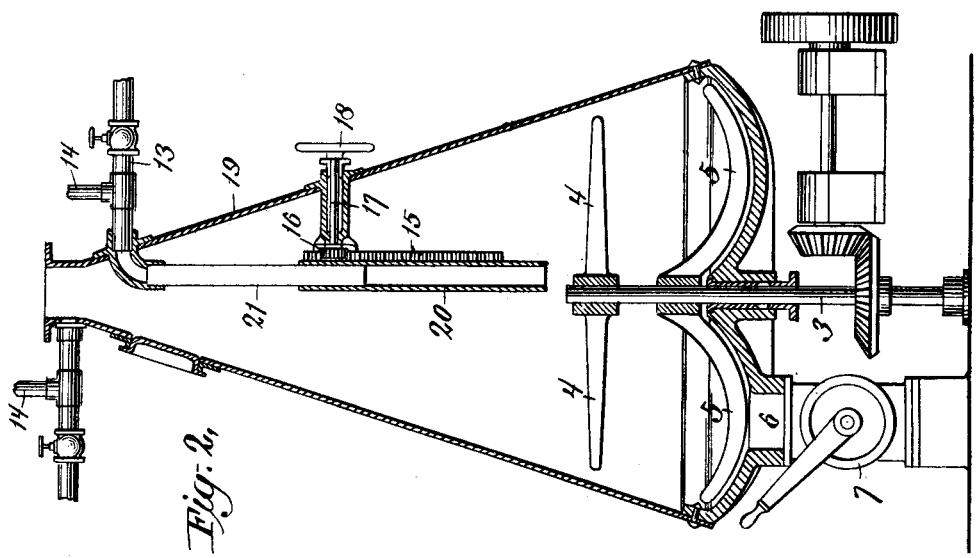
WITNESSES:
INVENTOR
BY
ATTORNEYS No. 675,949. Patented June 11, 1901.
D. H. HAYWOOD.
APPARATUS FOR SEPARATING FLUIDS OF DIFFERENT DENSITIES.
(Application filed Oct. 25, 1900.)
(No Model.) 2 Sheets—Sheet 2.

WITNESSES:

INVENTOR
D. Howard Haywood
BY
ATTORNEYS

UNITED STATES PATENT OFFICE.

DANIEL HOWARD HAYWOOD, OF NEW YORK, N. Y., ASSIGNOR TO NATHANIEL B. POWTER, OF BROOKLYN, NEW YORK.

APPARATUS FOR SEPARATING FLUIDS OF DIFFERENT DENSITIES.

SPECIFICATION forming part of Letters Patent No. 675,949, dated June 11, 1901.

Application filed October 25, 1900. Serial No. 34,245. (No model.)

*To all whom it may concern:*

Be it known that I, DANIEL HOWARD HAYWOOD, a citizen of the United States, residing at New York, in the county of New York and State of New York, have invented certain new and useful Improvements in Apparatus for Separating Fluids of Different Densities; and I do hereby declare the following to be a full, clear, and exact description of the invention, such as will enable others skilled in the art to which it appertains to make and use the same.

My invention relates to improvements in apparatus for extracting oil and grease from grease-bearing material, and more particularly to improvements in apparatus for separating oil and grease from water and solids.

My invention consists in employing a vessel having an oil-discharge conduit the orifice of which may be below the level of the oil in such vessel and in creating in such vessel a higher pressure than in the oil-discharge conduit, so that the oil is forced out through the discharge-conduit by the greater pressure upon the surface of the body of the oil.

My invention also consists in the novel details of construction and arrangement of the apparatus herein described.

The objects of my invention are to avoid the use of an excess of water or similar fluid for floating off the oil contained in the digesters or separating vessels employed in the extraction of grease and oil and the consequent evaporation of such water in order to dry the solid residue and to make the apparatus employed as simple, inexpensive, and reliable as possible. These objects are attained in the invention herein described, and illustrated in the drawings which accompany and form a part of this specification, in which the same reference-numerals indicate the same or corresponding parts, and in which—

Figure 1 is a central vertical section of one form of oil-separator constructed in accordance with my invention. Fig. 2 is a similar view of another form of separator; and Fig. 3 is a similar view of a third form of separator particularly intended for use in the extraction of fish-oils.

In the extraction of oil and grease from waste animal matter—such as fish, slaughter-house refuse, garbage, and the like—it is customary to treat such material in a digester with heat and moisture, so as to liberate the oil and grease, and then to separate the oil and grease from the water and the solid material by admitting a large quantity of water, and so floating the oil and grease upward and out through a suitable outlet. Such separation may be conducted either in the digester itself or in a separate vessel. This method is objectional in that it adds to the contents of the digester or other vessel a large quantity of water, all of which must be evaporated subsequently in order to dry the solid material remaining after the oil is removed. The evaporation of this water increases materially the cost of the treatment. In the apparatus herein described the floating off of the grease by the addition of an excess of water is avoided, and thereby the cost of drying the solid residue is very greatly decreased.

Referring to the drawings and first to Fig. 1, 1 designates a vessel adapted to be used for the separation of oil and grease from water and solid material. It may be the digester in which the treatment for the liberation of the oil and grease is conducted or it may be a separate vessel, into which the contents of such digester may be passed. Its charge may be introduced through a valve 2 at the top. The said vessel is provided with a stirrer-shaft 3, having stirring-arms 4 and scrapers 5, and is likewise provided with an outlet 6, through which the material remaining in the digester after the oil and grease have been removed may be withdrawn. Such discharge-outlet is normally closed by a valve 7. A pipe 8 projects downwardly from the valve 2. Upon it is mounted the tubular stem 9 of an inverted funnel 10, the diameter of which is preferably nearly that of the vessel 1. At the bottom such funnel is provided with a lip 11. A pipe 12, provided with a suitable valve, is connected to the upper portion of the vessel 1. Another pipe 13, likewise provided with a suitable valve, communicates with the interior of the tube 8 near the top of the vessel. A pressure-balancing pipe 14, provided with a suitable valve, connects the upper portion of the vessel 1 with the chamber of the valve 2, and so with the discharge-pipe 8.

The particular vessel shown in Fig. 1 is designed to be used for the separation of oil and grease from material which has been previously treated in a suitable digester for the purpose of liberating the oil and grease therein. The charge of such material admitted through the valve 2 passes downward through the tube 8 and stem 9 of the funnel into the lower portion of the vessel 1. The liquid accompanying such charge may rise above the inclined portion of the funnel, passing between the lip 11 and the sides of the vessel 1 into the space beneath the funnel. The charge having been introduced in this manner, the stirrer-shaft 3 is rotated for the purpose of thoroughly agitating the material within the vessel, thereby facilitating the rising of the oil and grease to the top and at the same time producing a centrifugal motion, which in itself tends to effect the separation of the oil and grease from the heavier contents of the separator. After the contents of the vessel have been sufficiently agitated to bring the oil and grease to the top the rotation of the stirring-shaft may be stopped and the oil and grease may be forced off through the funnel 10, tube 8, and pipe 13 by producing a condition of less pressure in the discharge-pipes than in the body of the vessel—as, for instance, by admitting air or steam under pressure through the pipe 12. Preferably the funnel 10 should be movably mounted upon the tube 8, as shown in the drawings, and means—such as a rack 15, pinion 16, and shaft 17, having a hand-wheel 18—should be provided to raise and lower the funnel. When the drawing off of the grease is first commenced, the bottom of the funnel should be immersed in the fluid, but should not be immersed very deeply, in order that the oil first drawn off may be the purest and lightest. As the oil and grease are drawn off, the funnel should be gradually lowered in order to keep the bottom of the funnel continuously in the liquid. If at any time the level of the liquid sinks below the lower edge of the funnel, this will be made evident by the blowing of air or steam (as the case may be) through the funnel, together with the stoppage of the flow of oil. By lowering the funnel as thus described substantially all of the oil and grease in the vessel may be drawn off, that portion of the oil which may have been above the funnel at the beginning likewise passing out by passing around the lower edge of the funnel and into the interior thereof. Finally, when all or substantially all of the oil and grease has been drawn off water will begin to come off and the operation may be stopped, or, if preferred, a considerable quantity of water may be drawn off in the same manner.

In the separation of oil and grease from animal material difficulty has been experienced in the past in the removal of such oil and grease, owing to the extreme viscosity of the oil and grease upon the surface of the fluid in the vessel wherein the separation is to be effected; but owing to the inclination of the sides of the funnel 10 all grease included within the ring 11 of said funnel will be carried upward by the water beneath it and will flow out through the pipe 13 before the water itself, or at least any considerable part of the water, has escaped. Owing to the depth of the lip 11 and the comparatively narrow space between said lip and the sides of the vessel 1, the grease on the outside of the funnel will also be forced into the funnel and so upward, for a layer of grease of any considerable thickness must necessarily be forced into the funnel by pressure above the fluid. The close proximity of the lip 11 to the sides of the vessel and the depth of the said lip insures a sufficient depth of oil to prevent the air or steam from laterally displacing the oil, owing to the viscosity of the latter, and so passing under the edge of the funnel until all but an infinitesimal proportion of the oil has been drawn off.

It is of course true that while the oil is being forced off in the manner above described the valve in the pipe 14 must be closed. A pressure-balancing device, such as the pipe 14, is necessary in order that the liquid may rise above the funnel while the vessel is receiving its charge.

A vent-valve 14' is provided. By opening it the balance of pressure upon the inside and outside of the vessel may be restored or maintained.

In Fig. 2 another form of vessel is shown. The vessel there shown and numbered 19 does not differ essentially from the vessel 1 of Fig. 1, except in form and except that instead of a funnel 10 a pipe 20, mounted upon a tube 21, connected to the pipe 13 and corresponding generally to the tube 8 of Fig. 1, is employed. This construction may be employed where it is not deemed necessary to remove the oil substantially without admixture with water or where the oil does not have so great viscosity as to require the use of a funnel.

In Fig. 3 I have shown my invention applied to a digester of a type employed in the extraction of oil and other products from fish material. The treatment of such material must be conducted at a comparatively low temperature in order to avoid injury to the products, and therefore the digester is heated by means of a water-jacket. 22 is the digester, and 23 the water-jacket. The digester is provided with a removable cover 24, by removing which a charge may be placed in the digester, and with a discharge-valve 25. It is also provided with a discharge-pipe 13, a tube 8, connected therewith, a funnel 10, provided with a lip 11, and a rack-and-pinion mechanism for raising and lowering the funnel. Within the digester there is a heating-chamber 26, connected by pipes 27 and 28 with the jacket; but the use of this heating-chamber forms no part of my present invention. The removal of the oil and grease is conducted in the same manner in this digester as in that shown in Fig. 1. After the treatment of the charge for the liberation of the oil and grease is complete, the valves in the inlet-pipe 12 and outlet-pipe 13 are opened and the oil is drawn off.

I do not limit myself to the use of my invention in the separation of oil and grease from fluids of greater density, but may use it in the separation of any fluids of different densities, neither do I limit myself to the particular details of construction herein illustrated and described.

Having thus completely described my machine, what I claim, and desire to secure by Letters Patent, is—

1. In an apparatus for separating liquids of different densities, the combination, with a liquid-containing vessel, of a discharge-conduit therefor, having a vertically-adjustable member containing the inlet-opening, means for moving such movable section up and down, and means for creating in such vessel a greater pressure than in the discharge-conduit.

2. In an apparatus for separating liquids of different densities, the combination, with a liquid-containing vessel, of a discharge-conduit therefor, provided with a telescopic section containing the inlet-opening of the conduit, means for moving such telescopic section up and down, and means for creating in said vessel a greater pressure than in the discharge-conduit.

3. In an apparatus for separating liquids of different densities, the combination, with a liquid-containing vessel, of a discharge-conduit terminating in the vessel in an inverted funnel the mouth of which is below the normal level of the lighter liquid in said vessel, and means for creating in said vessel a greater pressure than in the discharge-conduit.

4. In an apparatus for separating liquids of different densities, the combination, with a liquid-containing vessel, of a discharge-conduit, terminating in the vessel in an inverted and vertically-adjustable funnel, and means for creating in such vessel a greater pressure than in the discharge-conduit.

5. In an apparatus for separating liquids of different densities, the combination, with a liquid-containing vessel, of a discharge-conduit terminating in the vessel in an inverted and vertically-adjustable funnel, the diameter of said funnel being nearly that of the portion of the vessel in which it is located, and means for creating in the vessel a greater pressure than in the discharge-conduit.

6. In an apparatus for separating liquids of different densities, the combination, with a liquid-containing vessel, of a discharge-conduit terminating in the vessel in an inverted and vertically-adjustable funnel, the diameter of said funnel being nearly that of the portion of the vessel in which it is located, and said funnel having a downwardly-projecting lip, and means for creating in the vessel a greater pressure than in the discharge-conduit.

7. In an apparatus for separating liquids of different densities, the combination, with a liquid-containing vessel, having a charging-opening in its upper part, a tube projecting downward, and forming a continuation of the charging-opening, and means for carrying away liquid rising in said tube, of a funnel at the lower end of said tube, and means for creating in the tube a lower pressure than in the main portion of the vessel.

8. In an apparatus for separating liquids of different densities, the combination, with a liquid-containing vessel, having a charging-opening in its upper part, a tube projecting downward and forming a continuation of the charging-opening, said tube being provided at the bottom with a vertically-adjustable extension, means for adjusting such extension, and means for carrying away liquid rising in said tube, of means for creating in the tube a lower pressure than in the main portion of the vessel.

9. In an apparatus for separating liquids of different densities, the combination, with a closed liquid-containing vessel having a charging-opening in its top, and provided with means for closing said opening, a tube projecting downward and forming a continuation of the charging-opening, and means for carrying away liquid rising in said tube, of an inlet-valve for admitting air, or other gas, into the body of the vessel, and a pressure-balancing passage, provided with a valve, connecting the said tube and the body of the vessel.

10. In an apparatus for separating liquids of different densities, the combination, with a liquid-containing vessel, of a discharge-conduit therefor, extending from the upper portion of the vessel downward, and the inlet-opening of which is normally below the normal level of the liquid in said vessel, and means for introducing air or other gas under pressure into the vessel.

11. In an apparatus for separating liquids of different densities, the combination, with a liquid-containing vessel, of a discharge-conduit therefor, extending from the upper portion of the vessel downward, and means for carrying away liquid rising in said tube, of an inlet-valve for admitting air, or other gas, into the body of the vessel, and a pressure-balancing passage, provided with a valve, connecting the said discharge-conduit and the body of the vessel.

12. In an apparatus for separating liquids of different densities, the combination, with a liquid-containing vessel, of an internal conduit therefor, extending from the upper portion of the vessel downward, and having at its lower end a movable extension, and means for moving said extension up and down, the said vessel and conduit having the one a discharge-outlet and the other an inlet for compressed air or other gas.

In testimony whereof I affix my signature in the presence of two witnesses.

DANIEL HOWARD HAYWOOD.

Witnesses:
HARRY M. MARBLE,
RITA BRADT.